US011884792B2

(12) United States Patent
Xue et al.

(10) Patent No.: US 11,884,792 B2
(45) Date of Patent: Jan. 30, 2024

(54) ANTI-BIOFOULING SHAPE-MEMORY COMPOSITE AEROGEL AND PREPARATION METHOD

(71) Applicant: Hefei University of Technology, Xuancheng (CN)

(72) Inventors: Jingzhe Xue, Xuancheng (CN); Yang Lu, Xuancheng (CN); Hao Xu, Xuancheng (CN); Hanye Xing, Xuancheng (CN); Qian Wang, Xuancheng (CN); Wenshu Wu, Xuancheng (CN); Sheng Chen, Xuancheng (CN); Kangkang Li, Xuancheng (CN); Yaxin Du, Xuancheng (CN); Zongshun Peng, Xuancheng (CN)

(73) Assignee: Hefei University of Technology, Xuancheng (CN)

( * ) Notice: Subject to any disclaimer, the term of this patent is extended or adjusted under 35 U.S.C. 154(b) by 0 days.

(21) Appl. No.: 18/295,278

(22) Filed: Apr. 4, 2023

(65) Prior Publication Data

US 2023/0323068 A1 Oct. 12, 2023

(30) Foreign Application Priority Data

Apr. 7, 2022 (CN) .......................... 202210363657.9

(51) Int. Cl.
*C08J 9/28* (2006.01)
*C08L 5/08* (2006.01)
(Continued)

(52) U.S. Cl.
CPC ................. *C08J 9/283* (2013.01); *C02F 1/14* (2013.01); *C08J 9/42* (2013.01); *C08K 3/30* (2013.01);
(Continued)

(58) Field of Classification Search
CPC ........ C08J 9/283; C08J 9/42; C08J 2205/026; C08J 2201/0484; C08J 2305/08;
(Continued)

(56) References Cited

U.S. PATENT DOCUMENTS

| 2010/0210745 A1 | 8/2010 | Mcdaniel et al. |
| 2020/0138033 A1 | 5/2020 | Baker |
| 2021/0115211 A1 | 4/2021 | Allain et al. |

FOREIGN PATENT DOCUMENTS

| CN | 109485910 A | * | 3/2019 | ............... C08J 9/28 |
| CN | 110354295 A | | 10/2019 | |

(Continued)

OTHER PUBLICATIONS

Translation of CN 109485910. (Year: 2019).*

(Continued)

*Primary Examiner* — Michael M Dollinger
*Assistant Examiner* — Christina H. W. Rosebach
(74) *Attorney, Agent, or Firm* — True Shepherd LLC; Andrew C. Cheng

(57) ABSTRACT

An anti-biofouling shape-memory composite aerogel includes a unidirectional chitosan aerogel channel, a plant polyphenol coating, and a polyphenol/iron ion chelate. The plant polyphenol coating is evenly distributed on an inner wall of the unidirectional chitosan aerogel channel, and the polyphenol/iron ion chelate is located at a top end of the unidirectional chitosan aerogel channel. The anti-biofouling chitosan-based composite aerogel has an evaporation rate of 1.96 kg·m$^{-2}$·h$^{-1}$ at an illumination intensity of 1 kW/m$^2$. The composite aerogel has shape-memory properties, and can quickly restore its original shape in water after extrusion, thereby accelerating the diffusion of substances to complete the modification of inner channels. In this way, desirable anti-biofouling ability is achieved, and excellent structural (Continued)

stability as well as continuous and efficient photothermal water evaporation are guaranteed in a complex water environment.

7 Claims, 25 Drawing Sheets

(51) Int. Cl.
*C08J 9/42* (2006.01)
*C08K 3/30* (2006.01)
*C02F 1/14* (2023.01)
*C02F 103/00* (2006.01)
*C02F 103/08* (2006.01)
*C02F 103/34* (2006.01)

(52) U.S. Cl.
CPC .......... *C08L 5/08* (2013.01); *C02F 2103/007* (2013.01); *C02F 2103/08* (2013.01); *C02F 2103/34* (2013.01); *C02F 2303/20* (2013.01); *C08J 2201/0484* (2013.01); *C08J 2205/026* (2013.01); *C08J 2305/00* (2013.01); *C08J 2499/00* (2013.01); *C08K 2003/3072* (2013.01)

(58) Field of Classification Search
CPC ... C08J 2499/00; C02F 1/14; C02F 2103/007; C02F 2103/08; C02F 2103/34; C02F 2303/20; C08K 3/30; C08K 2003/3072; C08L 5/08

See application file for complete search history.

(56) References Cited

FOREIGN PATENT DOCUMENTS

| CN | 112094418 A | 12/2020 |
| CN | 112500586 A | 3/2021 |
| CN | 113968994 A | 1/2022 |
| JP | H01301701 A | 12/1989 |
| KR | 20190103559 A | 9/2019 |

OTHER PUBLICATIONS

Translation of CN 113410473 by Xiao et al. (Year: 2021).*
Jing et al. "Simultaneous Adsorption of Cu2+ and Cd2+ by a Simple Synthesis of Environmentally Friendly Bamboo Pulp Aerogels: Adsorption Properties and Mechanisms". Polymers 2022, 14, 4909. https://doi.org/10.3390/polym14224909 (Year: 2022).*
Translation of CN 112742355 by Huo et al. (Year: 2021).*

* cited by examiner

Air            Contact angle < 5°

Original　　　　Compression　　　　Recovery

ANTI-BIOFOULING SHAPE-MEMORY COMPOSITE AEROGEL AND PREPARATION METHOD

CROSS-REFERENCE TO RELATED APPLICATIONS

This application claims priority to Chinese Patent Application No. 202210363657.9 with a filing date of Apr. 7, 2022. The content of the application mentioned above, including any intervening amendments thereto, is incorporated herein by reference.

TECHNICAL FIELD

The present disclosure relates to the technical field of nanomaterials, in particular to an anti-biofouling shape-memory composite aerogel and a preparation method and use thereof.

BACKGROUND

Interfacial solar evaporation is a new technology that offers an opportunity to produce clean water in a sustainable, eco-friendly and energy-efficient manner. This technology converts solar energy into thermal energy through photothermal conversion materials at a water-air interface, thereby accelerating water evaporation to separate water and pollutants. At present, porous photothermal materials can promote light absorption and steam release, weaken the salt resistance effect, and are widely used in solar evaporation. However, a large number of microorganisms in the real water environment can adhere to the inner and outer surfaces of porous materials and further proliferate to form biofilms. As a result, the formation of biofouling clogs the water and vapor transport channels, and eventually leads to a decrease in photothermal conversion and water evaporation. In nature, besides bacteria, fungal infestation can also contaminate the materials. Therefore, it is necessary to develop effective and convenient broad-spectrum antimicrobial and anti-biofouling designs for porous photothermal materials. In addition, to achieve stable use for a long time, photothermal water evaporation materials also need to have a desirable structural stability.

Through long-term research and practices, the present disclosure is provided to overcome the above defects.

SUMMARY OF PRESENT INVENTION

An objective of the present disclosure is to solve the problem that most existing solar evaporation devices do not have the ability to inhibit biofouling and resist damages to the structure caused by external force. The present disclosure provides an anti-biofouling shape-memory composite aerogel and a preparation method and use thereof.

To achieve the above objective, the present disclosure provides an anti-biofouling shape-memory composite aerogel, including a unidirectional chitosan aerogel channel, a plant polyphenol coating, and a polyphenol/iron ion chelate; the plant polyphenol coating is evenly distributed on an inner wall of the unidirectional chitosan aerogel channel, and the polyphenol/iron ion chelate is located at a top end of the unidirectional chitosan aerogel channel.

Further, the plant polyphenol coating includes TA, and the polyphenol/iron ion chelate includes a ferric sulfate hydrate.

Further, the composite aerogel has an evaporation rate of 1.96 $kg \cdot m^{-2} \cdot h^{-1}$ under a simulated sunlight intensity of 1 $kW/m^2$.

The present disclosure further provides a method for preparing the anti-biofouling shape-memory composite aerogel, including the following steps:

S1: preparation of a biomimetic chitosan aerogel: pouring a chitosan solution into a polystyrene mold, conducting freezing by unidirectional freeze casting, and then freeze-drying to obtain an original chitosan aerogel; washing the original chitosan aerogel with a methanol solution containing sodium hydroxide and a tert-butanol solution in sequence, and freeze-drying again to obtain the biomimetic chitosan aerogel; and S2: preparation of a biomimetic chitosan-tannic acid (TA)-iron composite aerogel: preparing a TA-aminopropyltriethoxysilane (APTES) solution, immersing the biomimetic chitosan aerogel in the TA-APTES solution to adsorb TA molecules through a compression-release cycle and hence obtain a biomimetic chitosan-TA composite aerogel; immersing a top end of the biomimetic chitosan-TA composite aerogel in a ferric sulfate solution to form a TA-Fe photothermal layer, washing with deionized water, and freeze-drying to obtain the biomimetic chitosan-TA-iron composite aerogel.

Further, in step S1, the chitosan solution has a concentration of 2%, and the methanol solution containing sodium hydroxide has a concentration of 1%.

Further, a mass ratio between the TA and the ferric sulfate hydrate is 1:1.

Further, in step S2, the top end of the biomimetic chitosan-TA composite aerogel is immersed in a ferric sulfate solution for 0.5 h to 2 h.

The present disclosure further provides use of the anti-biofouling shape-memory composite aerogel in interfacial solar-driven photothermal water treatment.

In the present disclosure, the chitosan-based composite aerogel includes a unidirectional channel, a TA antifouling coating, and a TA/Fe-ion chelate photothermal layer. The aerogel has a stable structure and desirable water evaporation performances. The unidirectional channel of the aerogel accelerates water transport and ensures continuous and efficient water evaporation. The TA anti-fouling coating is uniformly and firmly adsorbed on the inner wall of the channel through a compression-release cycle, thus providing an excellent anti-fouling performance. The top layer of the aerogel turns dark black through the coordination and chelation of TA and Fe ions, endowing the aerogel with a high-efficiency photothermal conversion performance. After being compressed by external force under water, the chitosan-based biomimetic composite aerogel can recover to its original state by absorbing water. This ensures structural stability and is effective in anti-biofouling. The aerogel can effectively inhibit *Escherichia coli*, *Staphylococcus aureus*, and *Candida albicans* from mass-propagation in the channel of the aerogel to clog the pores and channels, thereby ensuring long-term stability of the evaporation rate. In addition, the evaporation rate of the aerogel has cycle stability during the treatment of simulated sewage containing dyes and simulated seawater containing salt.

In the present disclosure, a method for preparing the chitosan-based composite aerogel includes: pouring a chitosan solution into a polystyrene mold, placing the mold on a copper plate pre-cooled by liquid nitrogen, freezing with the liquid nitrogen, and freeze-drying in a freeze-dryer to obtain an original chitosan aerogel; washing the chitosan aerogel in a methanol solution containing sodium hydroxide and a tert-butanol solution in sequence, and then freeze-drying to obtain a biomimetic chitosan aerogel; immersing the biomimetic chitosan aerogel in a TA-APTES solution, such that the TA is adsorbed through a compression-release cycle in the solution, and placing a top end of an obtained biomimetic chitosan-TA composite aerogel in a ferric sulfate solution, to form a dark black photothermal layer through coordination and complexation with Fe ions. A resulting product is washed with deionized water by shaking, and freeze-dried to obtain a biomimetic chitosan-TA-iron composite aerogel.

Compared with the prior art, the present disclosure has the following beneficial effects: a chitosan-TA-iron biomimetic unidirectional porous aerogel is designed and prepared in the present disclosure. The shape-memory properties of the chitosan-based biomimetic unidirectional porous aerogel complete the rapid modification of internal pores and channels of the aerogel by the plant polyphenol. The photothermal effect of the iron-TA realizes high-efficiency solar evaporation. The composite aerogel has desirable antibacterial and anti-biofouling properties, and can effectively prevent bacteria and fungi from forming biofilms inside the pores and channels. The composite aerogel maintains 86.8% to 92.1% of its original water evaporation performance in a high-concentration microbial environment. Meanwhile, the composite aerogel maintains the shape-memory properties, and can withstand external forces and return to its original state underwater, thereby achieving a long-term structural stability. In addition, the composite aerogel has excellent recyclability in artificial seawater and artificial sewage.

DETAILED DESCRIPTION OF THE EMBODIMENTS

The above and other technical features and advantages of the present disclosure will be described below in more details in connection with the accompanying drawings.

Example 1

In this example, a method for preparing a biomimetic chitosan aerogel (CS aerogel) includes the following steps:
(1) 2 g of a chitosan powder was evenly mixed into 99 mL of deionized water and 1 mL of acetic acid, and then stirred overnight to obtain a 2% chitosan solution;
(2) the chitosan solution was oriented-frozen with liquid nitrogen for 30 min, and then freeze-dried for 48 h to obtain an original chitosan aerogel; and
(3) the original chitosan aerogel was immersed for washing in a methanol solution containing sodium hydroxide and a tert-butanol solution in sequence, frozen with liquid nitrogen, and then freeze-dried to obtain the biomimetic chitosan aerogel.

Figure 1:
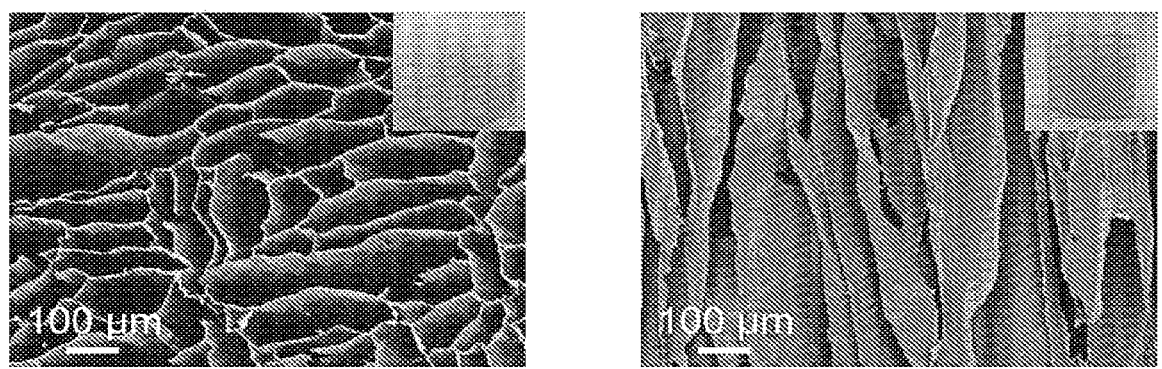
FIG. 1 shows a scanning electron microscopy (SEM) photo of transverse and longitudinal sections of a chitosan aerogel.

FIG. 1 showed a SEM image and a real image of transverse and longitudinal sections of the chitosan aerogel in this example. It was found that the chitosan aerogel had an oriented channel in the longitudinal direction and a honeycomb porous structure in the transverse direction, and had a pore size of 20 μm to 200 μm.

Example 2

In this example, a method for preparing a chitosan-TA-iron composite aerogel (CST aerogel) includes the following steps:
(1) preparation of a TA-Tris buffer: 0.2 g of a TA powder was dissolved in 100 mL of a Tris-HCl buffer (pH=8.5), and then ultrasonicated for 10 min to obtain the TA-Tris buffer;
(2) preparation of a TA-APTES solution: 0.2 g of APTES was dissolved in 20 mL of absolute ethanol, slowly added to a TA buffer, and then mixed evenly to obtain the TA-APTES solution;
(3) a chitosan aerogel was immersed in the TA-APTES solution, allowed to stand for 6 compression-release cycles, washed, and freeze-dried to obtain a biomimetic chitosan-TA aerogel; and
(4) a top end of the chitosan-TA aerogel was immersed in a 0.2% ferric sulfate solution, and the TA and Fe ions were chelated and coordinated for 0.5 h to make the top end dark black; an obtained product was cleaned, and freeze-dried to obtain the biomimetic chitosan-TA-iron composite aerogel.

Figure 2:
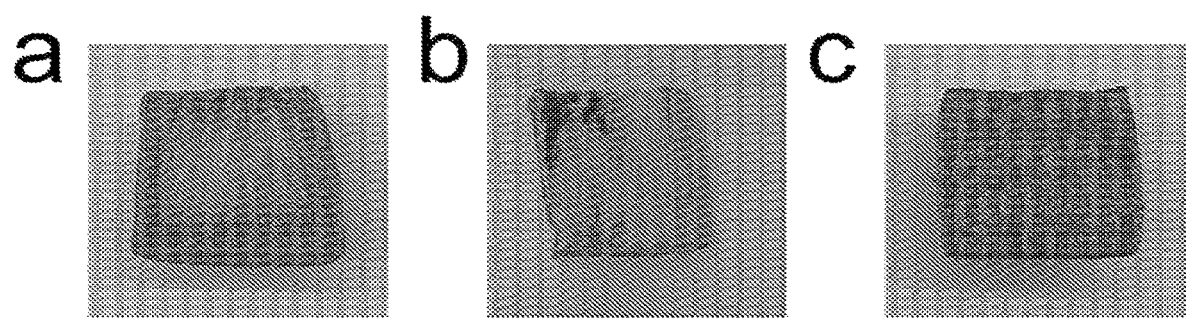
FIG. 2 shows that a chitosan-TA aerogel (a) and natural oak (b) are directly placed in a $Fe^{3+}$ solution for 12 h, and shows a real photo (c) after the chitosan-TA aerogel undergoes 6 compression-release cycles in the $Fe^{3+}$ solution.

FIG. 2 showed that the chitosan-TA aerogel (a) and natural oak (b) were directly placed in a $Fe^{3+}$ solution for 12 h, and showed a real image (c) after the chitosan-TA aerogel underwent 6 compression-release cycles in the $Fe^{3+}$ solution; the TA and $Fe^{3+}$ were prone to coordination to form a black substance. According to a content of the black substance, it showed that the shape-memory properties could significantly promote the transport of substances in the channel, and realized the full modification of a channel surface. Effective channel modification played a key role in achieving desirable anti-biofouling performances.

Figure 3:
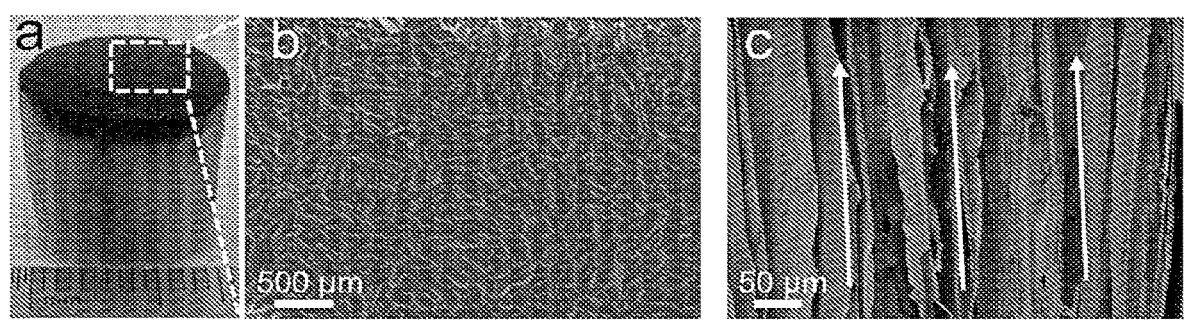
FIG. 3 shows a real photo and a SEM image of transverse and longitudinal sections of a chitosan-TA-iron composite aerogel.

FIG. 3 showed a real image and a SEM image of transverse and longitudinal sections of the chitosan-TA-iron composite aerogel in this example. There was an oriented channel structure in the longitudinal direction, and a honeycomb porous structure in the transverse direction, providing channels for water transmission and steam overflow. In the real image, the top layer was dark black, which could absorb and convert sunlight into heat; the lower end was reddish brown, and had an anti-biofouling ability to resist the growth and reproduction of microorganisms on the surface of the aerogel.

Figure 4:
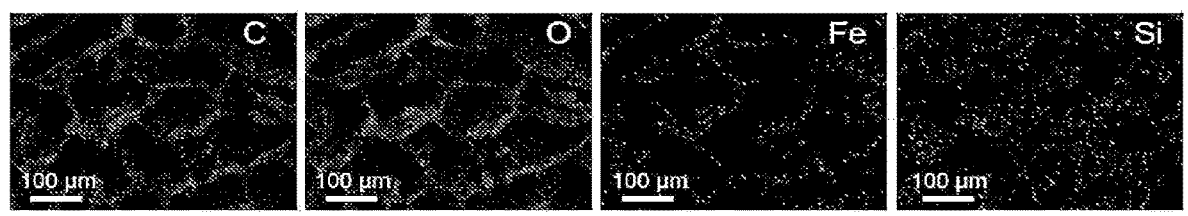
FIG. 4 shows a distribution of elements for the cross section of the chitosan-TA-iron composite aerogel.

FIG. 4 showed an EDS mapping-based energy spectrum distribution for the cross section of the chitosan-TA-iron composite aerogel in this example. It was seen from the energy spectrum that the composite aerogel had C and O element signals of the chitosan, S1 element signal in the APTES, and Fe element signal of the ferric sulfate. The signal distribution presented a porous outline of the aerogel, proving that the top end of the chitosan aerogel was evenly modified with a TA-Fe layer.

Figure 5:
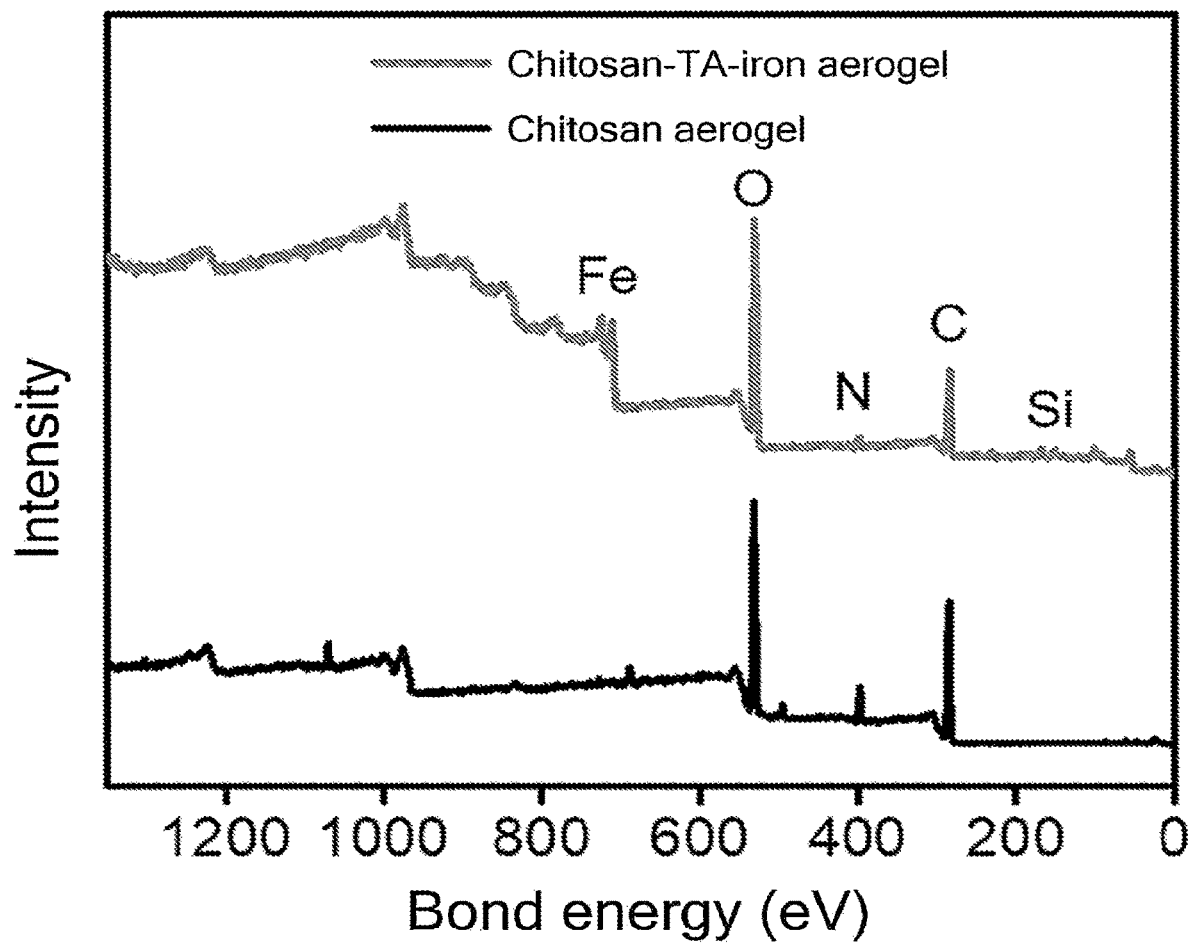
FIG. 5 shows X-ray photoelectron spectroscopy (XPS) images of the chitosan-TA-iron composite aerogel and the chitosan aerogel.

FIG. 5 showed XPS images of the chitosan-TA-iron composite aerogel and the chitosan aerogel. In the XPS spectrogram, only C, N, and O element signals appeared in the chitosan aerogel; however, in the chitosan-TA-iron composite aerogel, C, N, O element signals as well as Fe and S1 element signals appeared. This proved the existence of the TA-Fe layer.

Figure 6:
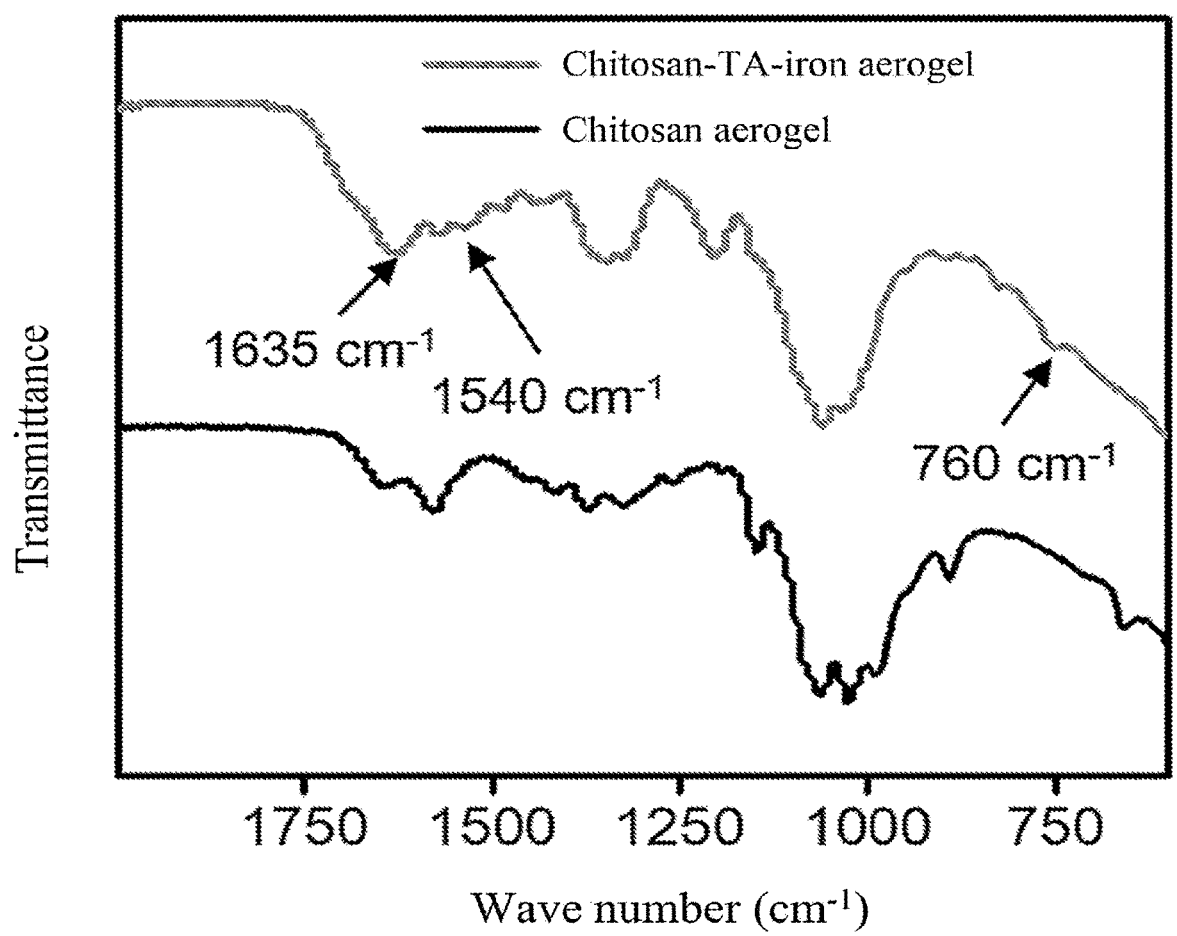
FIG. 6 shows infrared spectrograms of the chitosan-TA-iron composite aerogel and the chitosan aerogel.

FIG. 6 showed infrared spectrograms of the chitosan-TA-iron composite aerogel and the chitosan aerogel. It was found that the chitosan-TA-iron composite aerogel had new absorption peaks at wavelengths of 1,635 $cm^{-1}$, 1,540 $cm^{-1}$, and 760 $cm^{-1}$, which corresponded to the vibration of a —C=N group, the stretching vibration of a benzene ring, and the vibration of TA-Fe+, respectively. This demonstrated the coordination and chelation of the top TA-Fe layer.

Figure 7:
FIG. 7 shows a water contact angle of the chitosan-TA-iron composite aerogel.

FIG. 7 showed a water contact angle of the chitosan-TA-iron composite aerogel. It was seen from the figure that the contact angle formed by water droplets on the aerogel was less than 5°, indicating that the aerogel had an excellent hydrophilic ability.

Figure 8:
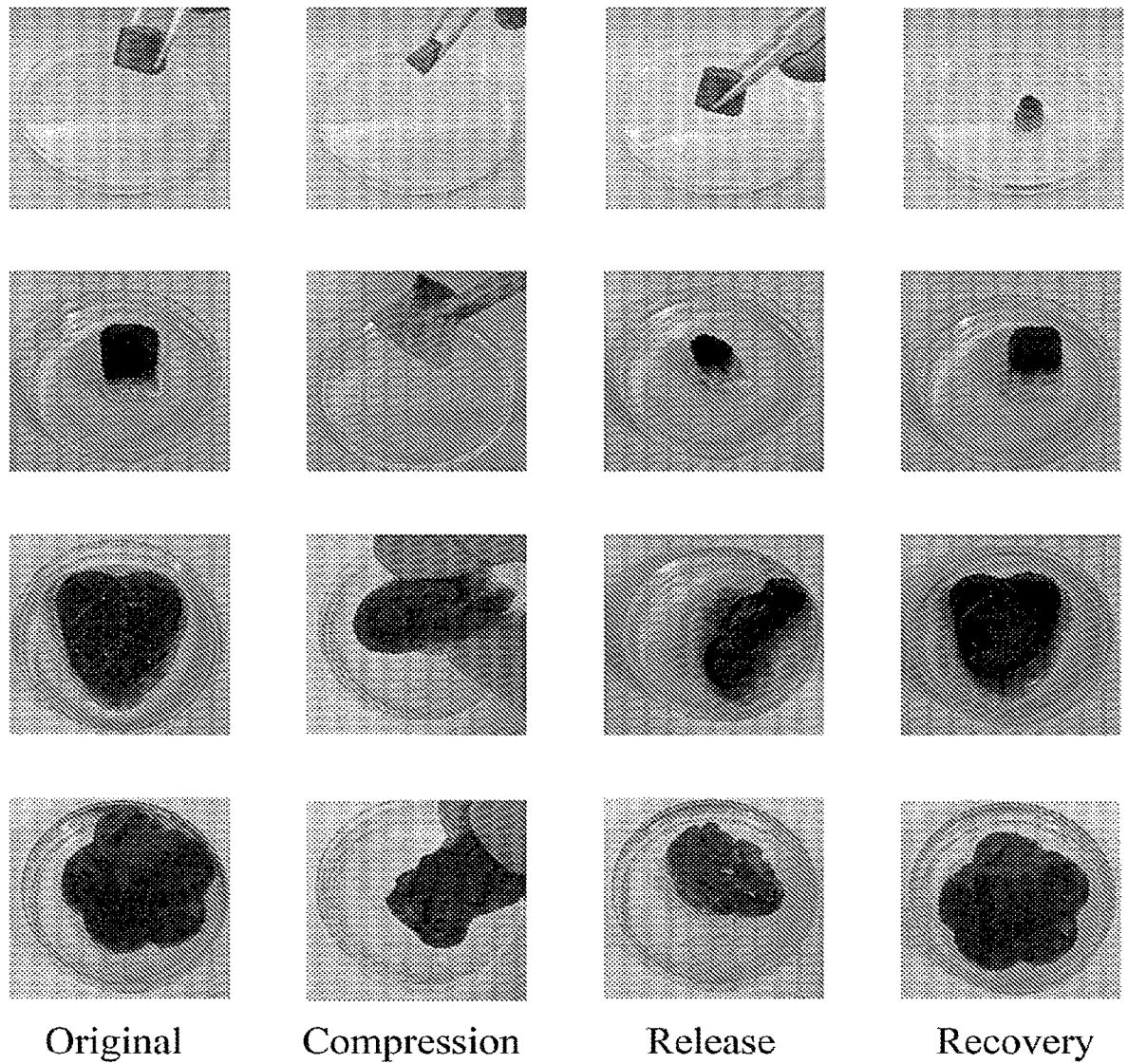
FIG. 8 shows a real photo of a shape-memory function of the chitosan-TA-iron composite aerogel in water.

FIG. 8 showed a real image of a shape-memory function of the chitosan-TA-iron composite aerogel in water in this example. It was seen from the figure that the cylindrical, square, heart-shaped, and petal-shaped composite aerogels prepared by different molds could quickly absorb water and returned to their original states after being deformed in an aqueous solution by external forces such as extrusion and folding. This showed that the aerogel had the ability to resist external force and recover.

Figure 9:
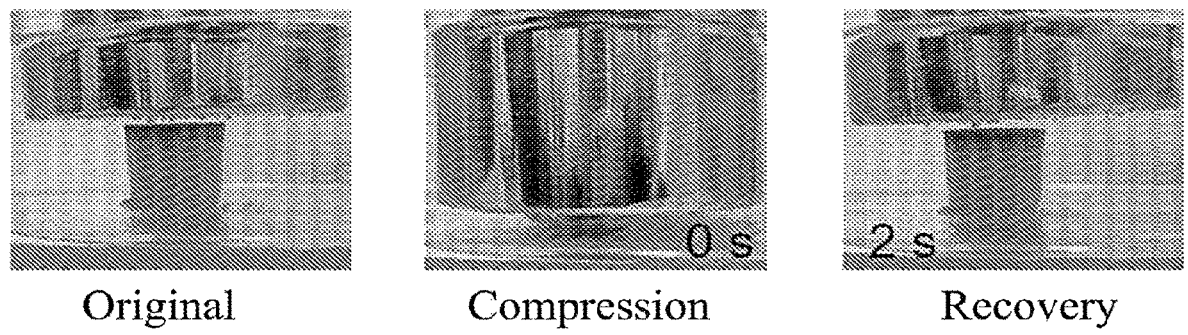
FIG. 9 shows a real photo of a compression recovery ability of the chitosan-TA-iron composite aerogel under water.

FIG. 9 showed a real image of a compression recovery ability of the chitosan-TA-iron composite aerogel under water. In order to further illustrate the rate of recovery, the aerogel was compressed by approximately 90% underwater, and the external force was quickly withdrawn. It was found that the aerogel quickly recovered to its original state within 2 sec, indicating excellent compression recovery ability.

Figure 10:
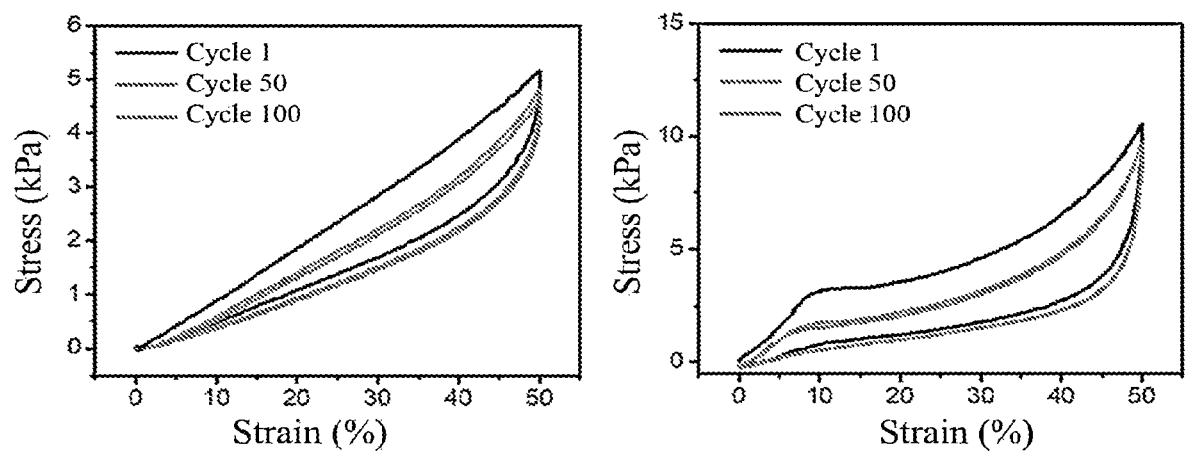
FIG. 10 shows a stress-strain curve of the chitosan-TA-iron composite aerogel circulating 100 circles underwater at transverse and longitudinal compressive strains of 50%.

FIG. 10 showed a stress-strain curve of the chitosan-TA-iron composite aerogel circulating 100 circles underwater at transverse and longitudinal compressive strains of 50%. The composite aerogel had small plastic deformations of 1.0% and 2.8% after being compressed in the transverse and longitudinal directions, and could basically recover to its original state.

Figure 11:
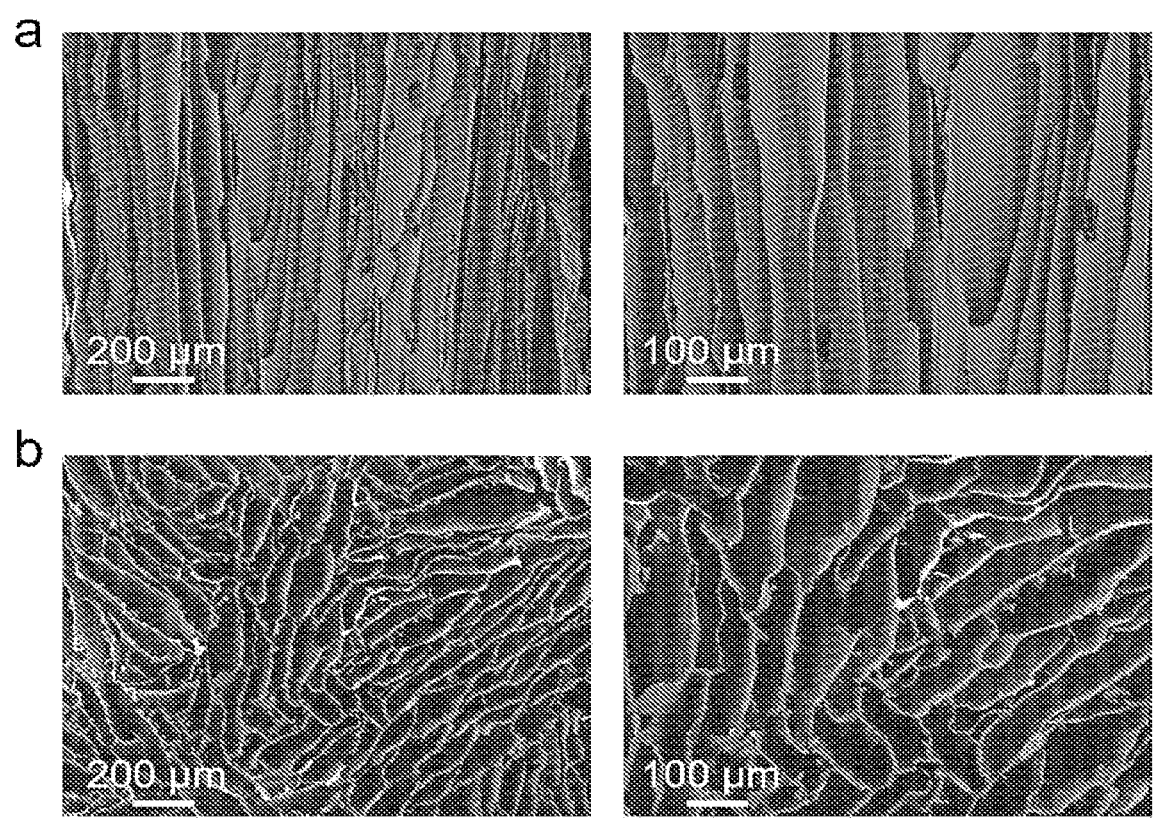
FIG. 11 shows a SEM image of the transverse and longitudinal sections of the chitosan-TA-iron composite aerogel after 100 compression cycles under water.

FIG. 11 showed a SEM image of the transverse and longitudinal sections of the chitosan-TA-iron composite aerogel after 100 compression cycles under water. Through the observation of a channel structure, it was found that the channel structure after compression was not changed significantly compared with the original state. This proved that the composite aerogel had an excellent ability to resist structural damage by external forces.

Figure 12:
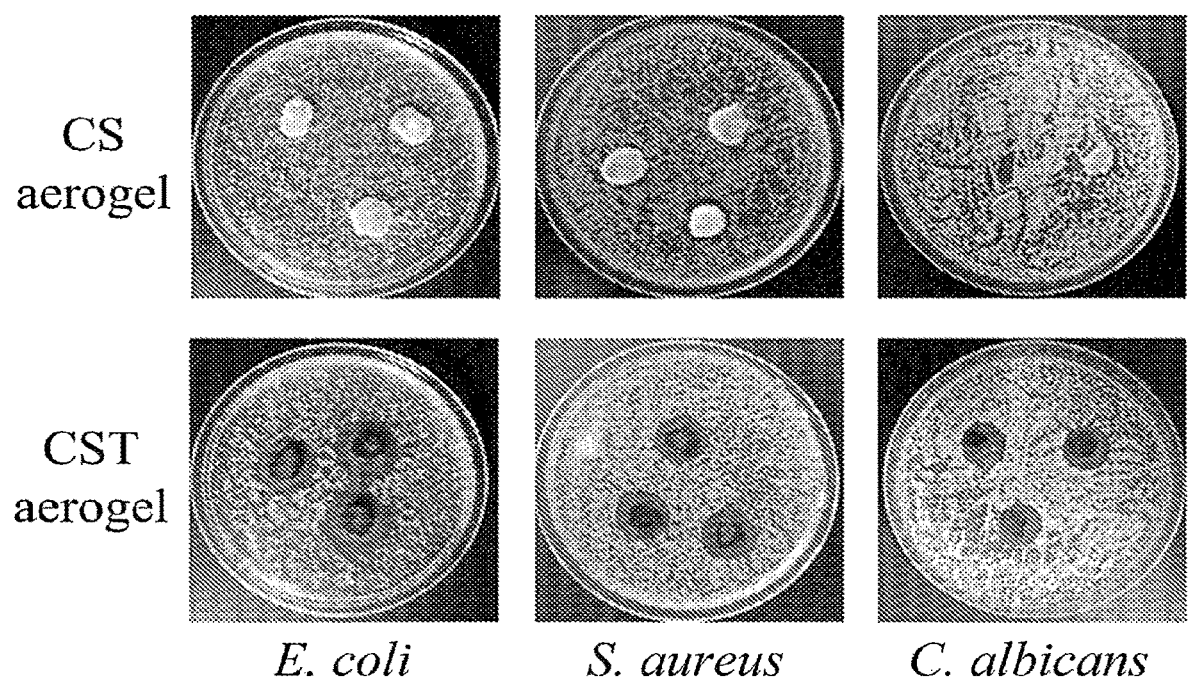
FIG. 12 shows inhibition zones of the chitosan-TA-iron composite aerogel and the chitosan aerogel of *Escherichia coli*, *Staphylococcus aureus*, and *Candida albicans*.
Figure 13:
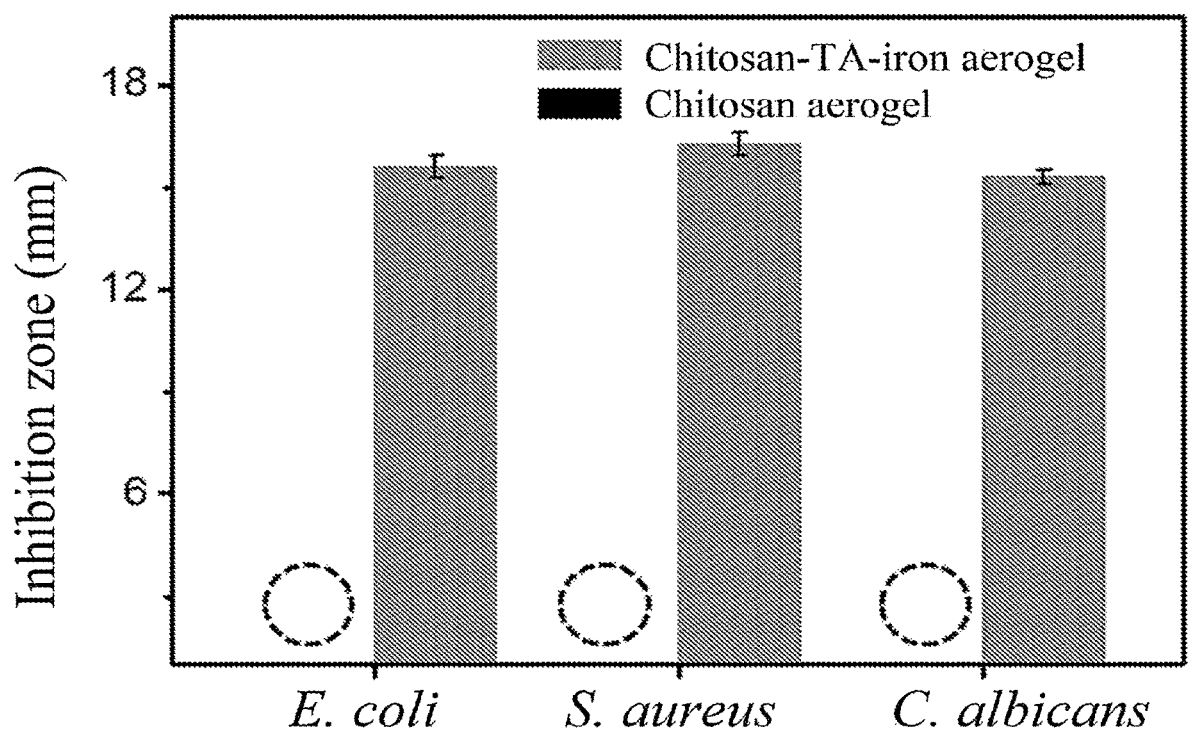
FIG. 13 shows inhibition zone diameters (IZDs) of the chitosan-TA-iron composite aerogel and the chitosan aerogel of the *E. coli*, the *S. aureus*, and the *C. albicans*.

The inhibitory abilities of the chitosan-TA-iron composite aerogel and the chitosan aerogel samples to bacteria (*E. coli* and *S. aureus*) and a fungus (*C. albicans*) were evaluated by the inhibition zone method. Different aerogel samples were placed on a bacterial culture plate and a fungal culture plate that were inoculated with 105 CFU/mL. The bacterial culture plate and the fungal culture plate were cultured at 37° C. and 30° C. for 24 h, respectively, and then the IZD was observed. FIG. 12 showed inhibition zones of the chitosan-TA-iron composite aerogel and the chitosan aerogel of *E. coli, S. aureus*, and *C. albicans*. The chitosan aerogel sample did not have inhibition zones in high-concentration *E. coli, S. aureus*, and *C. albicans*, indicating a limited antimicrobial ability. The chitosan-TA-iron composite aerogel sample had an obvious inhibition zone around the culture plates of bacteria and fungus, indicating that TA had a desirable inhibitory ability to the bacteria and fungus. FIG. 13 counted the IZDs on different culture plates. The IZDs of the chitosan-TA-iron composite aerogel to *E. coli, S. aureus*, and *C. albicans* were 15.6 mm, 16.26 mm, and 15.3 mm, respectively. However, the IZD of the chitosan aerogel was negligible. This proved that the chitosan-TA-iron composite aerogel had a certain antimicrobial ability.

Figure 14:
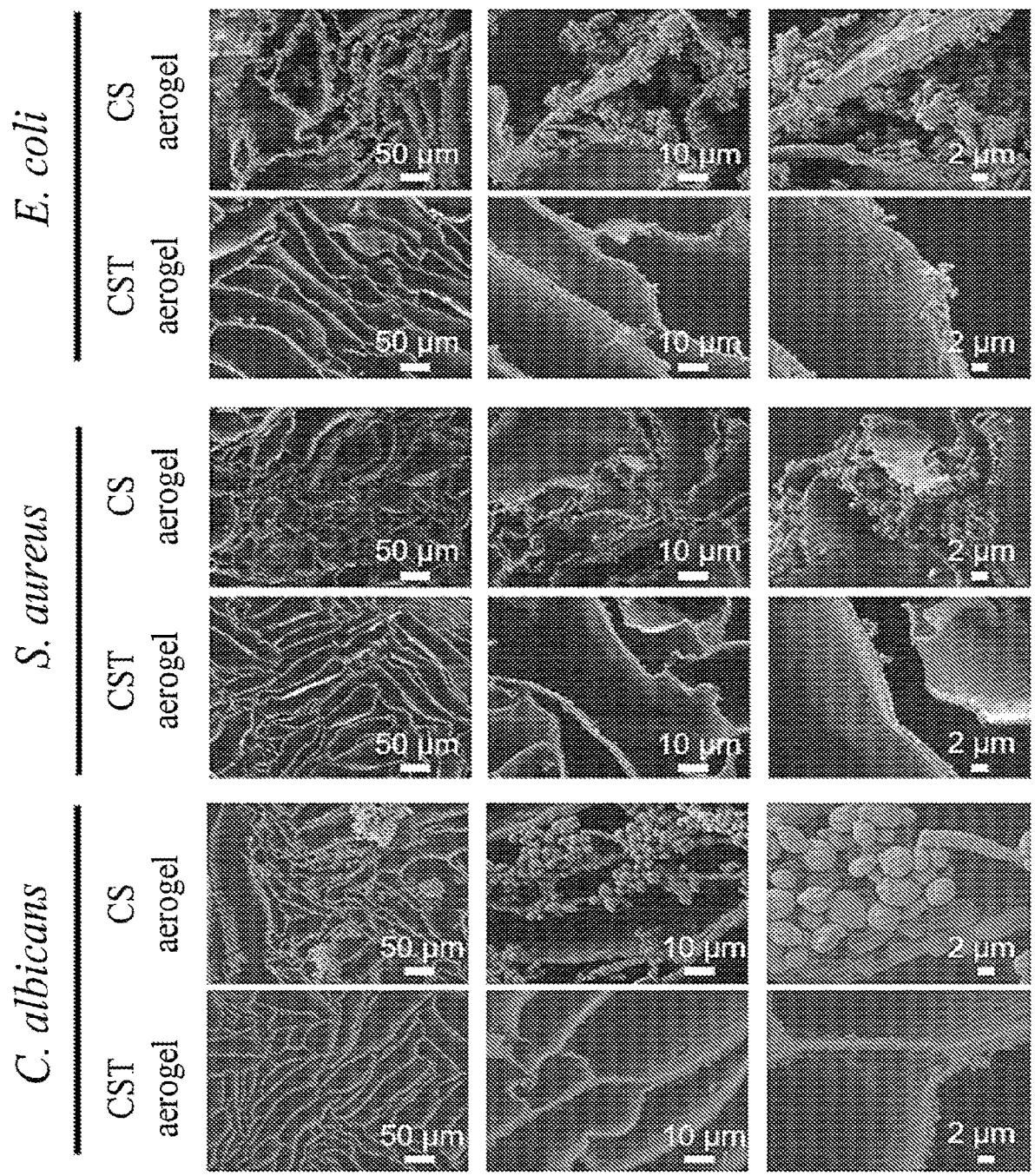
FIG. 14 shows SEM images of the chitosan-TA-iron composite aerogel and the chitosan aerogel after the *E. coli*, the *S. aureus*, and the *C. albicans* are cultivated for 72 h.

In order to further observe the microbial growth inside different aerogels, the aerogel samples were immersed in culture bottles of *E. coli, S. aureus*, and *C. albicans* with a concentration of 105 CFU/mL, and then cultured in a shaker at 37° C. and 30° C. for 3 d. After the culture, the aerogel samples were observed by SEM. FIG. 14 showed SEM images of the chitosan-TA-iron composite aerogel and the chitosan aerogel after the *E. coli*, the *S. aureus*, and the *C. albicans* are cultivated for 3 d. The chitosan aerogel adhered a large number of corresponding bacterial species on its surface, and these microorganisms accumulated to form a dense biofilm and clogged the pores and channels. After being cultured in the microbial bacterial solution, the chitosan-TA-iron composite aerogel had only a few bacterial cells adhered on its surface, and had a structure remaining intact. It showed that the chitosan-TA-iron composite aerogel with a TA coating could effectively inhibit the growth and reproduction of bacteria and fungi, and ensured that the aerogel material was not contaminated by microorganisms. In this way, microbial cells were prevented from multiplying and forming biofilms to clog the porous structure of the material, thereby avoiding affecting the water transmission and steam overflow capabilities.

Figure 15:
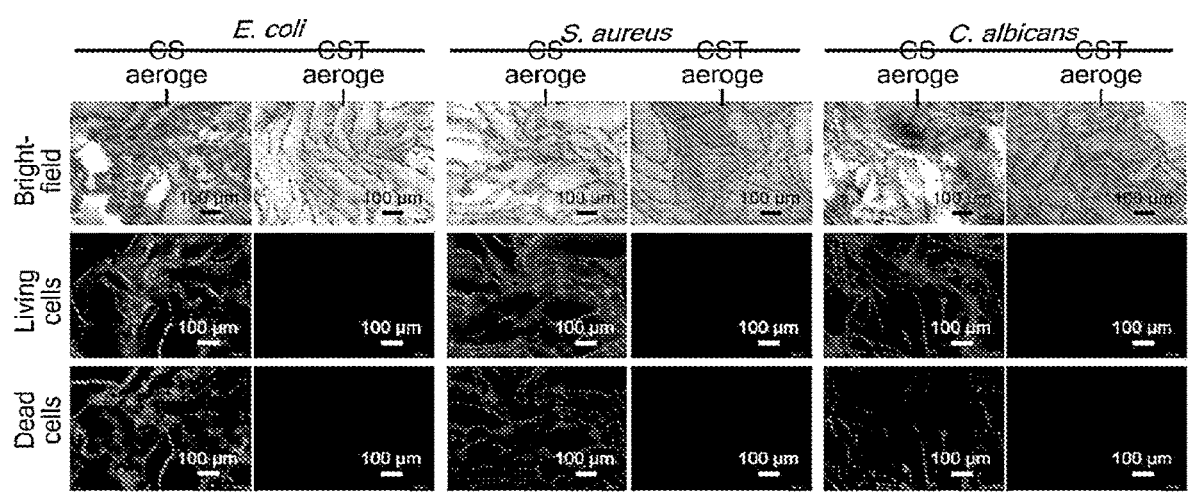
FIG. 15 shows fluorescence microscope photos after AM-PI staining of the chitosan-TA-iron composite aerogel and the chitosan aerogel after the *E. coli*, the *S. aureus*, and the *C. albicans* are cultivated for 72 h.

The biofilm formation of the aerogel samples was further observed by an inverted fluorescence microscope. The aerogel samples were cultured as above, washed with PBS three times, and stained with calcein AM-propidium iodide (calcein AM-PI) for 20 min. After staining, the aerogel samples were observed for biofilm formation using a fluorescence microscope at wavelengths of 490 nm and 545 nm. FIG. 15 showed fluorescence microscope images after AM-PI staining of the chitosan-TA-iron composite aerogel and the chitosan aerogel after the *E. coli*, the *S. aureus*, and the *C. albicans* are cultivated for 72 h. In bright-field images, the channel structure of the chitosan-TA-iron composite aerogel was hardly attached by microorganisms. However, a large amount of filled foreign matters was found on the surface and internal channels of the chitosan aerogel, resulting in pore clogging. In confocal fluorescence images, strong green and red fluorescence signals could be observed in the chitosan aerogel samples, showing the presence of abundant live/dead microbial cells. In contrast, weak fluorescence signals were observed in the chitosan-TA-iron composite aerogel, suggesting a little adhesion of microbial cells onto the surface of the material. This further demonstrated that the chitosan-TA-iron composite aerogel had an excellent ability of anti-biofouling, and could effectively resist the infestation of bacteria and fungi to reduce the adhesion of microorganisms. Therefore, the pores and channels can be kept unclogged to ensure the long-term stable use of the material in complex environments.

Figure 16:
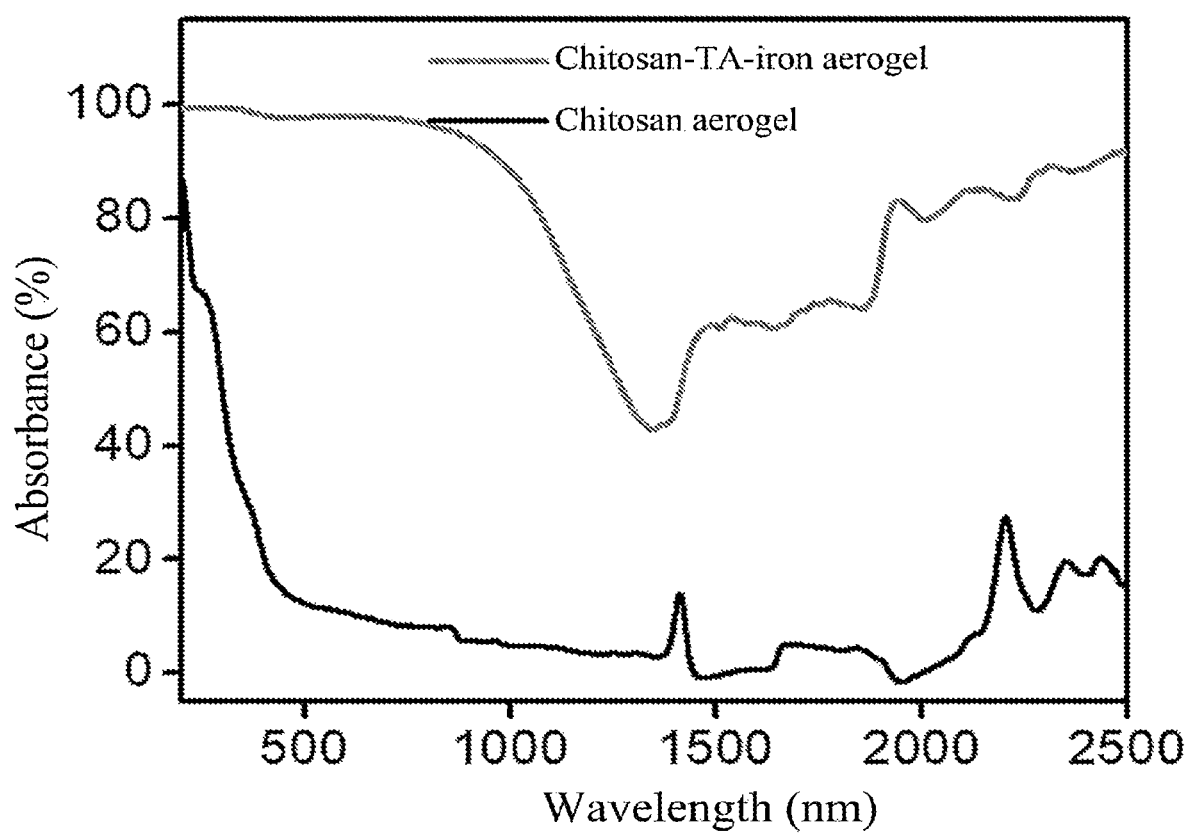
FIG. 16 shows ultraviolet-visible-near-infrared absorption spectrums of the chitosan-TA-iron composite aerogel and the chitosan aerogel.

FIG. 16 showed ultraviolet-visible-near-infrared absorption spectrums of the chitosan-TA-iron composite aerogel and the chitosan aerogel. It could be seen from the figure that the chitosan aerogel had a low absorption rate of light, and the absorption rate in most wavelength ranges was less than 20%. However, the overall absorption rate of the chitosan-TA-iron composite aerogel was greatly improved, and the absorption rate was as high as 90% in a spectral range of 200 nm to 1,000 nm. This showed that the TA-Fe layer had excellent solar absorption ability.

Figure 17:
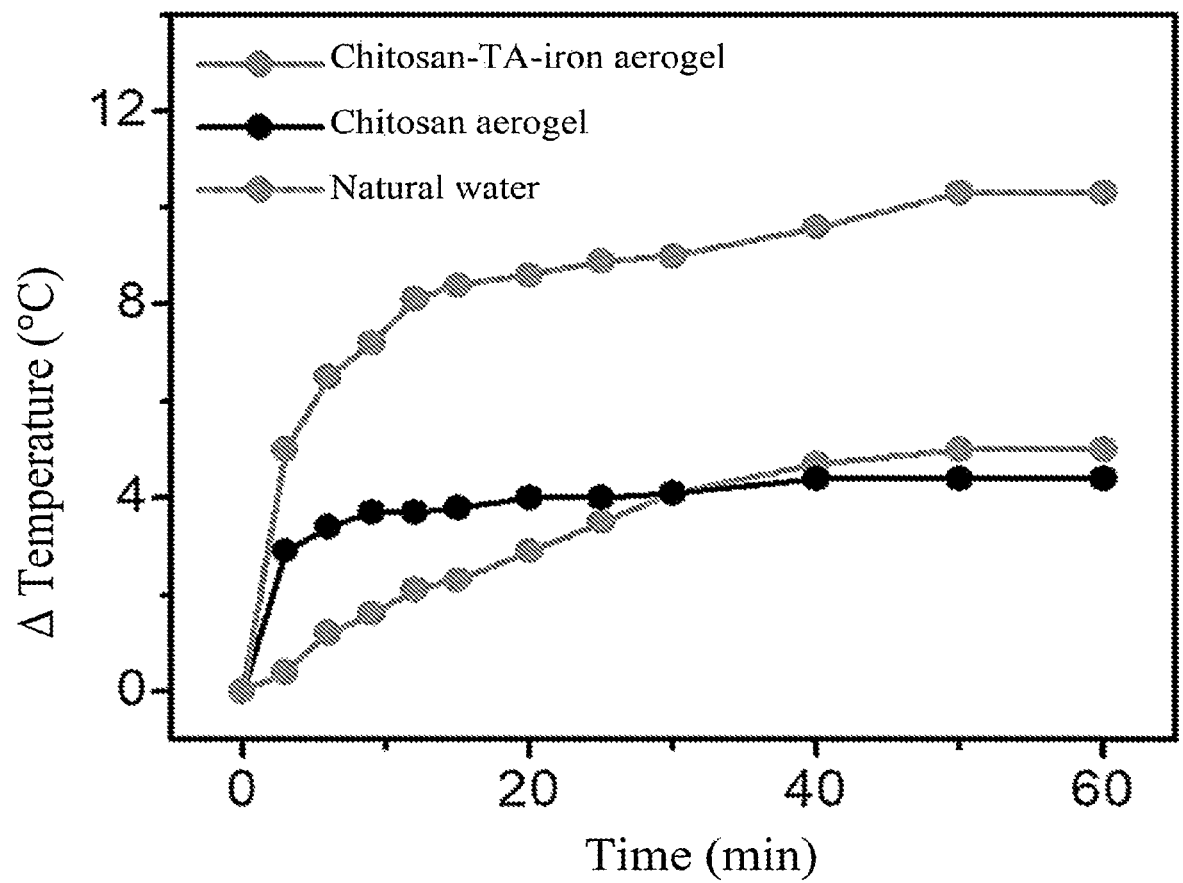
FIG. 17 shows heating curves of the chitosan-TA-iron composite aerogel, the chitosan aerogel, and water under 1 sun irradiation.

FIG. 17 showed heating curves of the chitosan-TA-iron composite aerogel, the chitosan aerogel, and water under 1 sun irradiation. The chitosan-TA-iron composite aerogel had a temperature rising rapidly by 8.1° C. within 12 min and then rising by 2.2° C. after 60 min in water, and could maintain a stable temperature for a long time. In contrast, under the same irradiation, the surface temperature of the chitosan aerogel increased slowly, and only increased by 4.4° C. even after 60 min, which was similar to the temperature change of water. These results confirmed that the black TA-Fe coating played a key role in solar photothermal conversion, thus improving the heating effect of materials.

Example 3

In this example, a method for preparing a chitosan/TA-iron aerogel (CS-TF aerogel) includes the following steps:
(1) preparation of a TA-Tris buffer: 0.2 g of a TA powder was dissolved in 100 mL of a Tris-HCl buffer (pH=8.5), to obtain the TA-Tris buffer;
(2) preparation of a TA-APTES solution: 0.2 g of APTES was dissolved in 20 mL of absolute ethanol, slowly added to a TA buffer, and then mixed evenly to obtain the TA-APTES solution;
(3) a top end of the chitosan aerogel was immersed in the TA-APTES solution, such that the top end was adsorbed with the TA, and a lower layer was kept as the chitosan aerogel; a TA layer on the upper surface was immersed in a 0.2% ferric sulfate solution to conduct coordination for 0.5 h, such that the TA on the upper surface was chelated and coordinated with $Fe^{3+}$ to obtain a photothermal layer. A resulting product was washed with deionized water, and freeze-dried to obtain the CS-TF aerogel.

Figure 18:
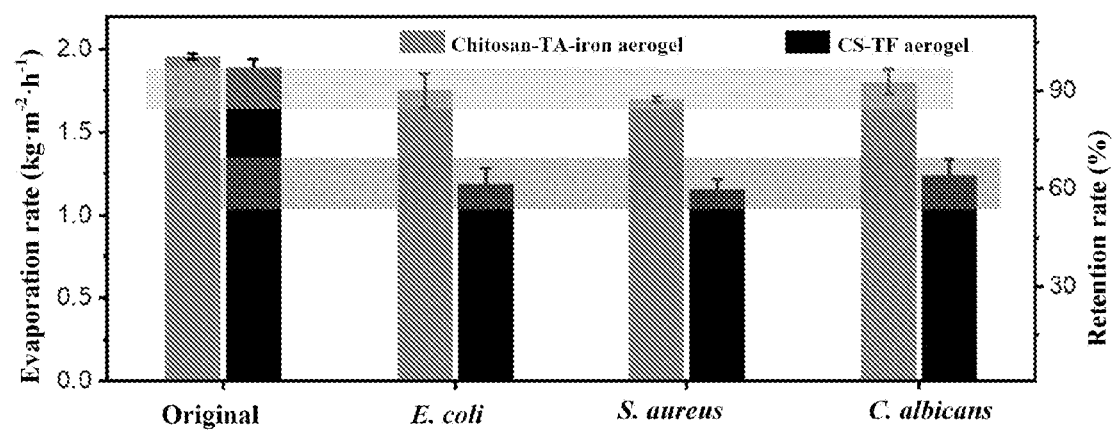
FIG. 18 shows an evaporation rate and a retention rate of the chitosan-TA-iron composite aerogel and a CS-TF aerogel before and after bacterial culture under 1 sun irradiation.

FIG. 18 showed an evaporation rate and a retention rate of the chitosan-TA-iron composite aerogel and the CS-TF aerogel before and after bacterial culture under 1 sun irradiation. In natural water, the CS-TF aerogel and the chitosan-TA-iron composite aerogel had evaporation rates of 1.89 $kg \cdot m^{-2} \ h^{-1}$ and 1.96 $kg \cdot m^{-2} \ h^{-1}$, respectively. The two aerogels were cultured in nutrient solutions of *E. coli*, *S. aureus*, and *C. albicans* for 72 h, respectively, and the evaporation rate was measured again. It was found that the CS-TF aerogel had evaporation rates obviously decreased to 1.24 $kg \cdot m^{-2} \ h^{-1}$, 1.16 $kg \cdot m^{-2} \ h^{-1}$, and 1.19 $kg \cdot m^{-2} \ h^{-1}$, respectively, which were only 65.6%, 61.4%, and 63.0% of the original evaporation rate. In comparison, the chitosan-TA-iron composite aerogel exhibited evaporation rates of 1.80 $kg \cdot m^{-2} \ h^{-1}$, 1.70 $kg \cdot m^{-2} \ h^{-1}$, and 1.75 $kg \cdot m^{-2} \ h^{-1}$ after cultured under the same conditions, which were significantly higher than that of the CS-TF aerogel, and were only slightly lowered by 8.2%, 13.3%, and 10.7% than the original evaporation rate performance (1.96 $kg \cdot m^{-2} \ h^{-1}$). From these results, the anti-biofouling design could guarantee a stable evaporation performance of the solar-driven water evaporator in bacteria-laden water.

Figure 19:
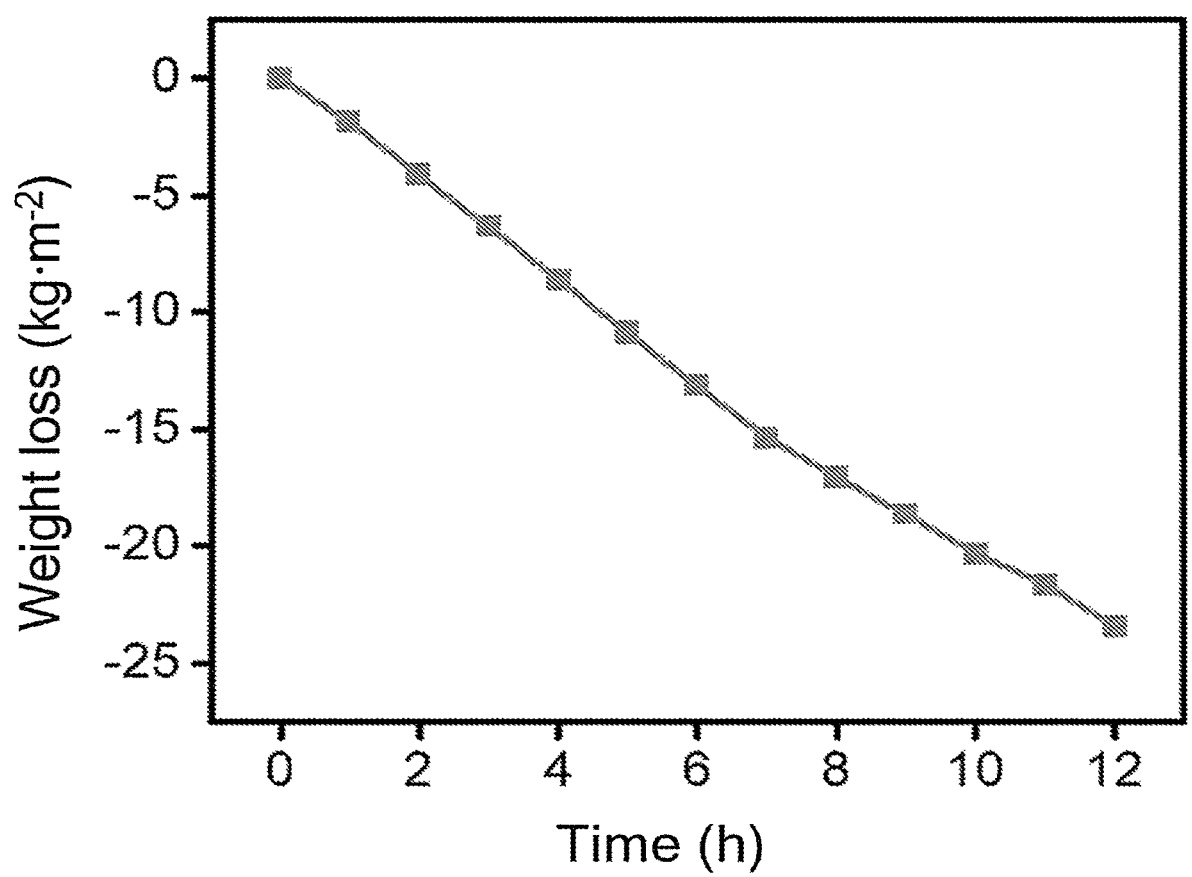
FIG. 19 shows a weight loss of the chitosan-TA-iron composite aerogel continuously evaporated in artificial seawater for 12 h.

FIG. 19 showed a weight loss of the chitosan-TA-iron composite aerogel continuously evaporated in artificial seawater for 12 h under 1 sun irradiation. There was a desirable linear trend, suggesting that the evaporation rate remained stable in the continuous 12 h uninterrupted test, with an average rate of approximately 1.95 $kg \ m^{-2} \ h^{-1}$.

Figure 20:
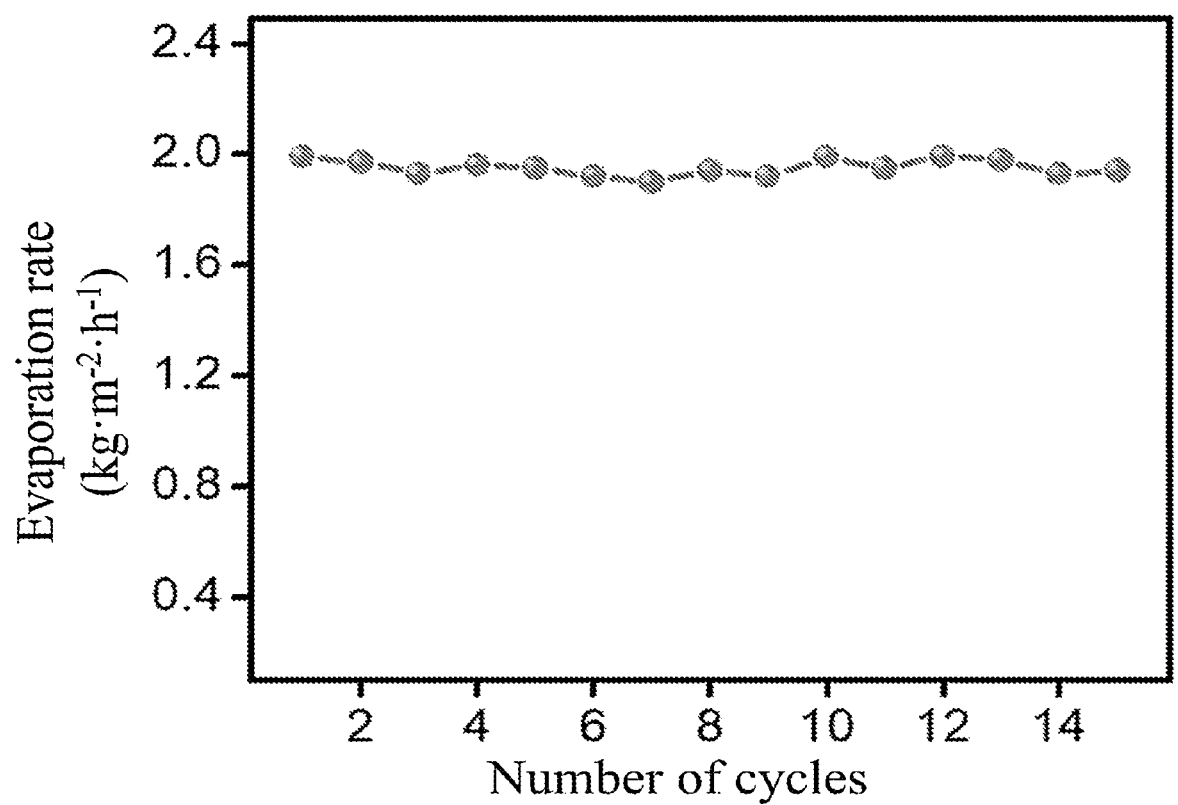
FIG. 20 shows an evaporation rate of the chitosan-TA-iron composite aerogel in artificial seawater for 15 cycles of evaporation.

FIG. 20 showed an evaporation rate of the chitosan-TA-iron composite aerogel in artificial seawater for 15 cycles of evaporation under 1 sun irradiation. The rate was maintained at approximately 1.95 $kg \cdot m^{-2} \ h^{-1}$, showing a stable evaporation performance.

Figure 21:
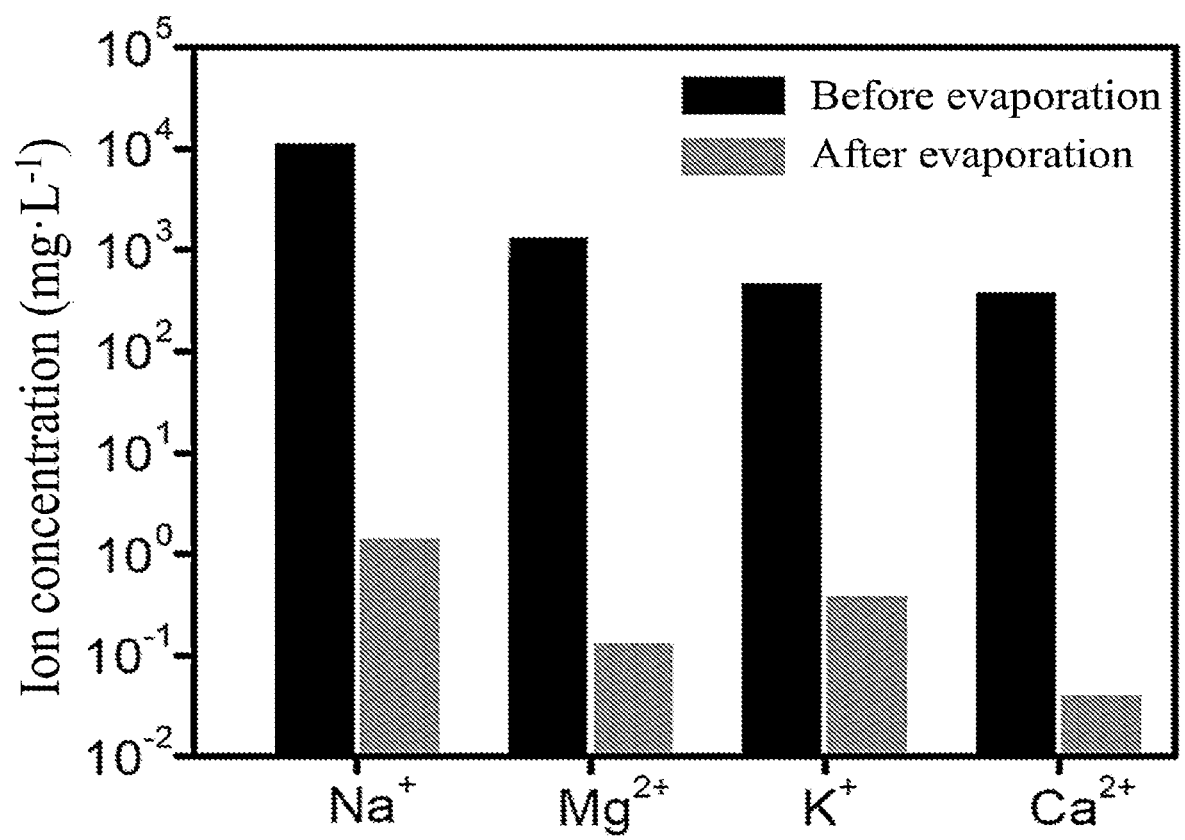
FIG. 21 shows concentration changes of sodium, magnesium, potassium, and calcium ions in water before and after the treatment with the chitosan-TA-iron composite aerogel.

The metal ion concentrations of original artificial seawater and condensed water collected after chitosan-TA-iron composite aerogel treatment were determined by inductively coupled plasma-atomic emission spectrometry (ICP-AES). As shown in FIG. 21, the original artificial seawater had $Na^+$, $Mg^{2+}$, $K^+$, and $Ca^{2+}$ ion concentrations as high as 11,120 mg/L, 1,307 mg/L, 474.5 mg/L, and 382 mg/L, respectively. The condensed water collected after treatment had $Na^+$, $Mg^{2+}$, $K^+$, and $Ca^{2+}$ ion concentrations of 1.38 mg/L, 0.13 mg/L, 0.38 mg/L, and 0.04 mg/L, respectively, indicating that the ion concentrations were significantly reduced by 4 to 5 orders of magnitude.

Figure 22:
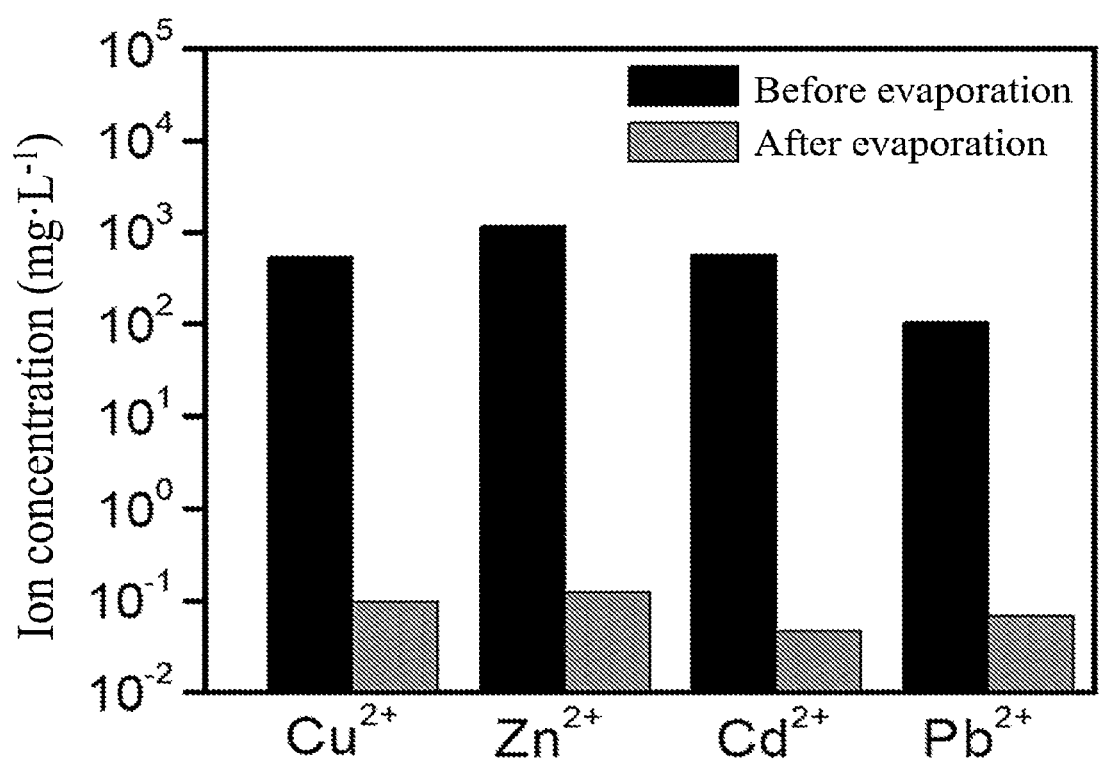
FIG. 22 shows concentration changes of copper, zinc, cadmium, and lead ions in water before and after the treatment with the chitosan-TA-iron composite aerogel.

The ion concentrations of industrial wastewater containing heavy metal ions and condensed water collected after chitosan-TA-iron composite aerogel treatment were determined by the ICP-AES. As shown in FIG. 22, the concentrations of $Cu^{2+}$, $Zn^{2+}$, $Cd^{2+}$, and $Pb^{2+}$ ions before chitosan-TA-iron composite aerogel treatment were 540.5 mg/L, 1,164 mg/L, 569.2 mg/L, and 104.5 mg/L, respectively. The concentrations of $Cu^{2+}$, $Zn^{2+}$, $Cd^{2+}$, and $Pb^{2+}$ ions in the purified water were reduced to 0.095 mg/L, 0.122 mg/L, 0.046 mg/L, and 0.067 mg/L, respectively, indicating that the concentrations of heavy metal ions in the simulated wastewater were significantly reduced.

Figure 23:
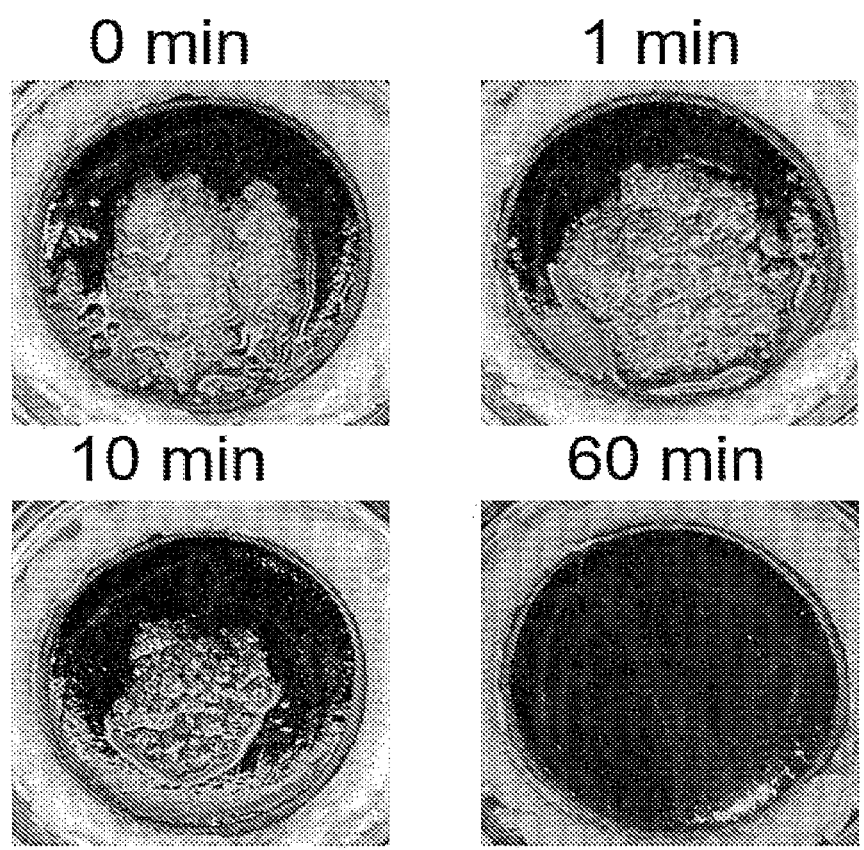
FIG. 23 shows a real photo of an anti-salting-out ability of the chitosan-TA-iron composite aerogel.

FIG. 23 showed a real image of an anti-salting-out ability of the chitosan-TA-iron composite aerogel. When 0.1 g of NaCl crystals were placed on the surface of the aerogel, the crystals disappeared within 60 min, indicating that the salt was redissolved into the bulk water. The excellent hydrophilicity and the vertically aligned microchannels of the aerogel worked together to provide sufficient water to the surface, such that salt crystals were dissolved in the capillary water and transferred back to the bulk water.

Figure 24:
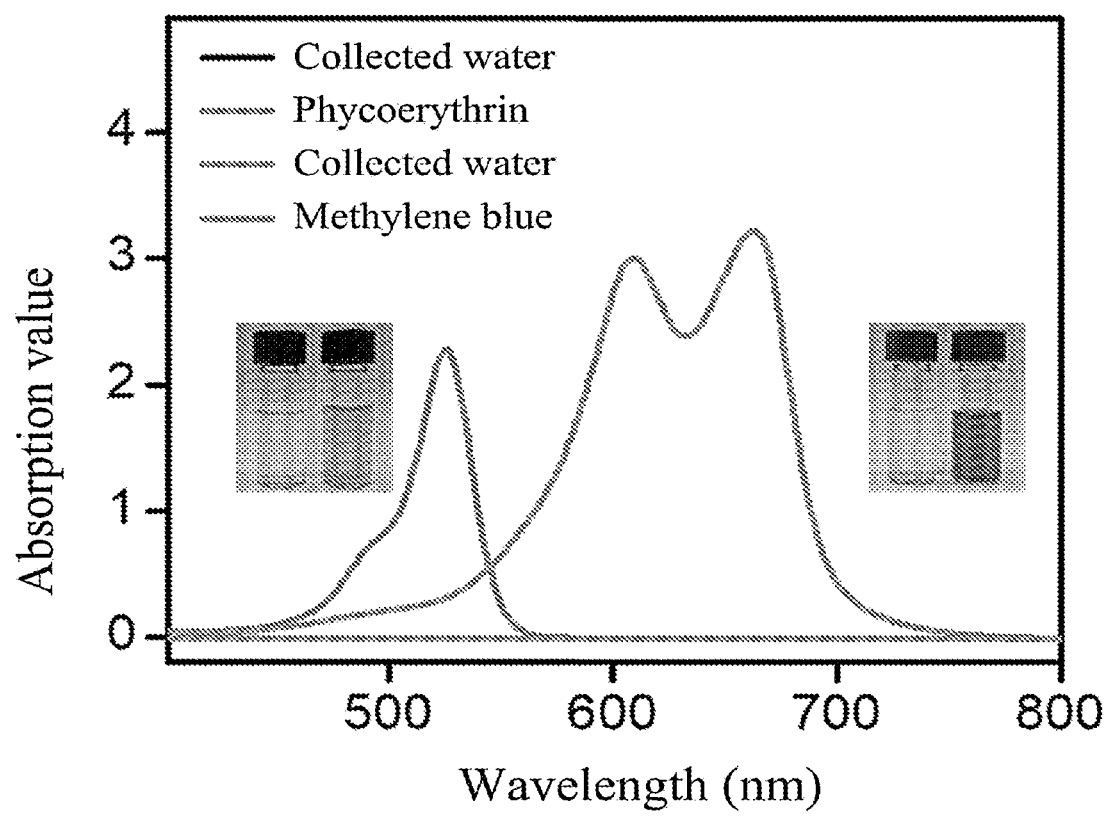
FIG. 24 shows ultraviolet-visible spectrums of solutions before and after treatment of phycoerythrin and methylene blue dyes by the chitosan-TA-iron composite aerogel.

FIG. 24 showed real images and ultraviolet-visible spectrums of solutions before and after treatment of phycoerythrin and methylene blue dyes by the chitosan-TA-iron composite aerogel. It was found that the purified water collected after treatment was clear and transparent, with almost no original red and blue appearing. The original methylene blue and phycoerythrin solutions and the corresponding collected condensed water were tested separately by a UV-Vis spectrophotometer. The test results showed that the purified condensed water did not have the characteristic peaks of the above two dyes. This suggested that the collected condensed water had basically removed the dyes, and the composite aerogel could be effectively used for the purification of dye wastewater.

Figure 25:
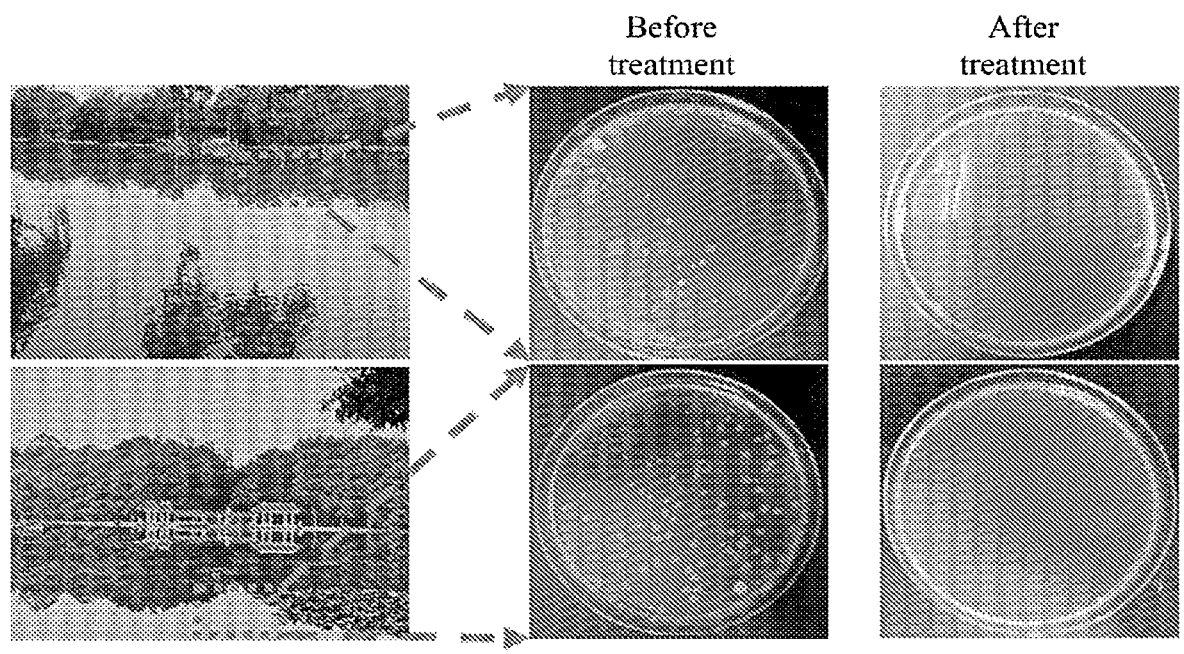
FIG. 25 shows changes of a bacterial concentration in water before and after treatment of natural rivers and lakes by the chitosan-TA-iron composite aerogel.

Rivers and lakes from Hefei were selected to test the changes in bacterial concentration, as shown in FIG. 25. The collected rivers and lakes' real water bodies and the purified water collected after composite aerogel treatment were cultured on two culture plates for 24 h, respectively, and then the two culture plates were observed. It was found that a large number of bacterial colonies grew on the culture plate with the real water bodies, while no colonies appeared on the culture plate with the collected purified water. This proved that there were no microorganisms in the condensed water collected by evaporation, thereby effectively avoiding the influence of microorganisms on water quality.

The above described are merely preferred examples of the present disclosure, and are merely illustrative rather than restrictive. It is to be understood that many alterations, modifications or even equivalent replacements can be made within the spirit and scope defined by the claims of the present disclosure, and should fall within the protection scope of the present disclosure.

What is claimed is:

1. An anti-biofouling shape-memory composite aerogel, comprising a unidirectional chitosan aerogel channel, a plant polyphenol coating, and a polyphenol/iron ion chelate, wherein the plant polyphenol coating is evenly distributed on an inner wall of the unidirectional chitosan aerogel channel, and the polyphenol/iron ion chelate is located at a top end of the unidirectional chitosan aerogel channel; wherein the anti-biofouling shape-memory composite aerogel is prepared by and a method comprising the following steps:

S1: preparation of a biomimetic chitosan aerogel: pouring a chitosan solution into a polystyrene mold, conducting freezing by unidirectional freeze casting, and then freeze-drying to obtain an original chitosan aerogel; washing the original chitosan aerogel with a methanol solution containing sodium hydroxide and a tert-butanol solution in sequence, and freeze-drying again to obtain the biomimetic chitosan aerogel; and S2: preparation of a biomimetic chitosan-tannic acid (TA)-iron composite aerogel: preparing a TA-aminopropyltriethoxysilane (APTES) solution, immersing the biomimetic chitosan aerogel in the TA-APTES solution to adsorb TA molecules through a compression-release cycle and hence obtain a biomimetic chitosan-TA composite aerogel; immersing a top end of the biomimetic chitosan-TA composite aerogel in a ferric sulfate solution to form a TA-Fe photothermal layer, washing with deionized water, and freeze-drying to obtain the biomimetic chitosan-TA-iron composite aerogel.

2. The anti-biofouling shape-memory composite aerogel according to claim 1, wherein the plant polyphenol coating comprises TA, and the polyphenol/iron ion chelate comprises a ferric sulfate hydrate.

3. The anti-biofouling shape-memory composite aerogel according to claim 1, wherein the composite aerogel has an evaporation rate of 1.96 $kg \cdot m^{-2} \cdot h^{-1}$ under a simulated sunlight intensity of 1 $kW/m^2$.

4. The anti-biofouling shape-memory composite aerogel according to claim 1, wherein in step S1, the chitosan solution has a concentration of 2%, and the methanol solution containing sodium hydroxide has a concentration of 1%.

5. The anti-biofouling shape-memory composite aerogel according to claim 1, wherein a mass ratio between the TA and the ferric sulfate hydrate is 1:1.

6. The anti-biofouling shape-memory composite aerogel according to claim 1, wherein in step S2, the top end of the biomimetic chitosan-TA composite aerogel is immersed in a ferric sulfate solution for 0.5 h to 2 h.

7. An interfacial solar-driven photothermal water treatment unit comprising the anti-biofouling shape-memory composite aerogel according to claim 1.

* * * * *